United States Patent
Ochi et al.

[11] Patent Number: 5,873,399
[45] Date of Patent: Feb. 23, 1999

[54] PNEUMATIC STUDLESS TIRES INCLUDING WAVE-SHAPED SIPES

[75] Inventors: Naoya Ochi; Kazunori Shinohara, both of Kodaira, Japan

[73] Assignee: Bridgestone Corporation, Tokyo, Japan

[21] Appl. No.: 767,308

[22] Filed: Dec. 16, 1996

[30] Foreign Application Priority Data

Dec. 14, 1995 [JP] Japan .................................. 7-326040

[51] Int. Cl.⁶ .................. B60C 11/12; B60C 105/00; B60C 107/00

[52] U.S. Cl. ................. 152/209 R; 152/DIG. 3

[58] Field of Search ............ 152/209 R, 209 D, 152/DIG. 3

[56] References Cited

U.S. PATENT DOCUMENTS

| | | | |
|---|---|---|---|
| D. 378,504 | 3/1997 | Ochi et al. ............... | D12/147 |
| 4,598,747 | 7/1986 | Flechtner .................. | 152/209 R |
| 5,301,727 | 4/1994 | Inoue ........................ | 152/209 R |
| 5,647,926 | 7/1997 | Van Der Meer et al. .... | 152/209 R |

FOREIGN PATENT DOCUMENTS

| | | |
|---|---|---|
| 0 108 212 | 5/1984 | European Pat. Off. . |
| 0 654 366 A1 | 5/1995 | European Pat. Off. . |
| 3540669 | 5/1987 | Germany ............. 152/DIG. 3 |
| 195 03 406 A1 | 8/1995 | Germany . |
| 64-9008 | 1/1989 | Japan ..................... 152/DIG. 3 |
| 4-159108 | 6/1992 | Japan ..................... 152/209 R |

OTHER PUBLICATIONS

PTO translation of German 3540669.

*Primary Examiner*—Steven D. Maki
*Attorney, Agent, or Firm*—Sughrue, Mion, Zinn, Macpeak & Seas, PLLC

[57] ABSTRACT

A pneumatic studless tire comprises a tread provided with a plurality of circumferential grooves, a plurality of lateral grooves and many blocks defined by these circumferential grooves and lateral grooves, in which (1) a plurality of wave-shaped sipes are formed in each of the blocks so as to make them dense at central region of the block in the widthwise direction of the tire and sparse at both side regions thereof, and (2) an amplitude of the wave-shaped sipe in each side region of the block is smaller than that in the central region of the block.

9 Claims, 2 Drawing Sheets

PNEUMATIC STUDLESS TIRES INCLUDING WAVE-SHAPED SIPES

BACKGROUND OF THE INVENTION

1. Field of the Invention

This invention relates to pneumatic studless tires, and more particularly to a studless tire having a tread provided with a plurality of circumferential grooves arranged at given intervals in a widthwise direction of the tire and extending in a circumferential direction of the tire or substantially in the circumferential direction, a plurality of lateral grooves arranged at given intervals in the circumferential direction and extending in the widthwise direction or substantially in the widthwise direction, many blocks defined by these circumferential grooves and lateral grooves and a plurality of wave-shaped sipes formed in each block and extending substantially in the same direction as in the lateral groove, and using on snow and ice road surfaces.

2. Description of Related Art

In a studless tire used on snow and ice road surfaces, when a plurality of lateral sipes are formed in each of the blocks defined by plural circumferential grooves extending in the circumferential direction and plural lateral grooves crossing these circumferential grooves, water film is cut by the lateral sipes to improve the running performance on ice. However, if it is intended to more improve the running performance on ice by increasing the number of lateral sipes, the rigidity of the block itself considerably lowers and hence the running performance on ice inversely lowers.

For this end, it is difficult to improve the running performance on ice of the studless tire above a certain level by conventional technique.

SUMMARY OF THE INVENTION

It is, therefore, an object of the invention to solve the aforementioned problem of the conventional technique and to provide pneumatic studless tires having excellent running performance on ice.

According to the invention, there is the provision of a pneumatic studless tire comprising a tread provided with a plurality of circumferential grooves arranged at given intervals in a widthwise direction of the tire and extending in a circumferential direction of the tire or substantially in the circumferential direction. A plurality of lateral grooves are arranged at given intervals in the circumferential direction and extending in the widthwise direction or substantially in the widthwise direction and many blocks defined by these circumferential grooves and lateral grooves. (1) a plurality of wave-shaped sipes extending substantially in the same direction as the lateral groove are formed in each of the blocks to render them dense in a central region of the block in the widthwise direction of the tire and sparse at both side regions of the block in the widthwise direction of the tire. (2) an amplitude of the wave-shaped sipe in each side region of the block in the widthwise direction of the tire is smaller than that in the central region of the block in the widthwise direction of the tire.

In preferable embodiments of the invention, the pitch of the wave-shaped sipe is large at the central region of the block in the widthwise direction of the tire and small at both side regions of the block. The distance between the wave-shaped sipes at the central region of the block is 1.5–4.5 mm, preferably 1.7–4.3 mm, and the amplitude of the wave-shaped sipe at the central region of the block is 1.25–10 times, preferably 1.3–8 times of that at both side regions of the block. A width of the central region of the block in the widthwise direction of the tire is 10–70%, preferably 20–65% of the width of the block in the widthwise direction of the tire. A least a part of a border line between the block and the lateral groove extends wavingly. The tire is provided on a widthwise central region of the tread with at least two circumferential ribs each having a plurality of wave-shaped sipes extending in the widthwise direction of the tire or substantially in the widthwise direction, an amplitude of which sipe being smaller than the amplitude of the wave-shaped sipe at both side regions of the block in the widthwise direction of the tire.

BRIEF DESCRIPTION OF THE DRAWINGS

The invention will be described with reference to the accompanying drawings, wherein.

DESCRIPTION OF PREFERRED EMBODIMENTS

Figure 1:
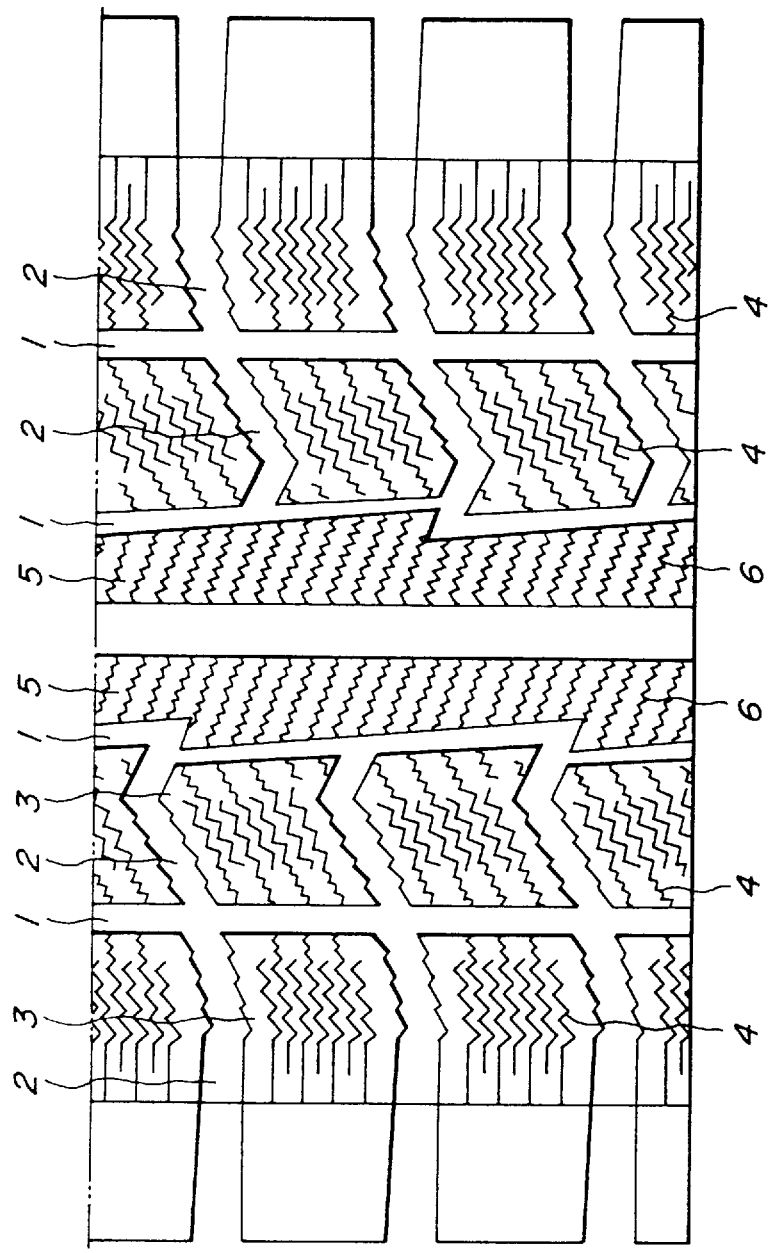
FIG. 1 is a developed view of an embodiment of the tread pattern in the tire according to the invention.

In the tire according to the invention, the wave-shaped sipes having a large amplitude are arranged in the central region of each block in the widthwise direction of the tire with a high density, whereby the edge component of the sipe is increased while lowering the block rigidity in the central region and hence the effect of absorbing water in the central region of the block and the scraping effect through the edge of the sipe are enhanced to improve the running performance on ice of the tire. If the sipe arrangement in the central region of the block is applied to both side regions of the block, the block rigidity in both side regions is lower than that in the central region thereof. In the tire according to the invention, therefore, the wave-shaped sipes having a large amplitude are arranged in the central region of each block in the widthwise direction of the tire with a high density as mentioned above, while the wave-shaped sipes having a small amplitude are arranged in both side regions of the block in the widthwise direction of the tire with a low density, whereby the lowering of the block rigidity in both side regions is prevented to improve the running performance on ice of the tire.

In the tire according to the invention, it is favorable that the amplitude of the wave-shaped sipe located at the central region of the block in the widthwise direction of the tire is 1.25–10 times, preferably 1.3–8 times of the amplitude of the wave-shaped sipe located at both side regions of the block as mentioned above. When the amplitude of the wave-shaped sipe in the central region of the block is less than the lower limit, the effect of preventing the lowering of the block rigidity in both side regions of the block is not obtained. When it exceeds the upper limit, the block rigidity in the central region of the block lowers extremely and it is apt to cause a phenomenon of falling down the block and hence the running performance on ice of the tire is degraded.

In the tire according to the invention, it is favorable that the distance between the wave-shaped sipes in the central region of the block in the widthwise direction of the tire is 1.5–4.5 mm, preferably 1.7–4.3 mm as mentioned above. When the distance between the wave-shaped sipes is less than the lower limit, falling-down of the block is apt to be caused in contacting with ground and it is difficult to manufacture the tire. When it exceeds the upper limit, the running performance on ice of the tire is degraded.

In the tire according to the invention, it is favorable that the width of the central region of the block in the widthwise direction of the tire is 10–70%, preferably 20–65% of the width of the block in the widthwise direction of the tire. When the width of the central region of the block is less than the lower limit, the edge effect and the water absorbing effect are considerably degraded. When it exceeds the upper limit, the block rigid in both side regions in the widthwise direction of the tire lowers extremely.

A tire of an example according to the invention and a tire of a comparative example will be described in detail with reference to the drawings. These tires have a tire size of 185/70R14.

In FIG. 1 is developmentally shown a tread pattern in the tire according to the invention.

As shown in FIG. 1, the tire of the example according to the invention comprises a tread provided with four circumferential grooves 1 arranged at given intervals in the widthwise direction of the tire and extending in the circumferential direction of the tire or substantially in the circumferential direction. A plurality of lateral grooves 2 are arranged at given intervals in the circumferential direction and extending substantially in the widthwise direction and many blocks 3 defined by these circumferential grooves 1 and lateral grooves 2. A greater part of a border line between the block 3 and the lateral groove 2 extends wavingly.

Seven wave-shaped sipes 4 extending substantially in the same direction as in the lateral groove 2 are arranged in each of these blocks 3, in which the number of sipes is 7 at the central region of the block in the widthwise direction of the tire and 3 or 4 at both side regions of the block in the widthwise direction of the tire so as to make the sipes dense in the central region and sparse in both side regions. Furthermore, the amplitude of the wave-shaped sipe 4 in the both side regions of the block 3 is 1 mm, while the amplitude of the wave-shaped sipe 4 in the central region of the block 3 is 2 mm. Therefore, the amplitude of the sipe in the central region of the block is 2 times of the amplitude of the sipe in both side regions of the block.

Also, the pitch of the wave-shaped sipe 4 is 4 mm at the central region of the block in the widthwise direction of the tire and 2 mm at both side regions thereof.

The distance between the wave-shaped sipes 4 is 2.5 mm at the central region of the block in the widthwise direction of the tire.

Moreover, the width of the central region of the block 3 in the widthwise direction of the tire is about 50% of the width of the block in the widthwise direction.

In the tire of the example, two circumferential ribs 5 are provided on a central portion of the tread as shown in FIG. 1, in which a plurality of wave-shaped sipes 6 extending substantially in the widthwise direction of the tire are arranged in the circumferential rib 5 amplitude of the wave-shaped sipe 6 in the circumferential rib 5 is smaller than the amplitude of the wave-shaped sipe 4 at the central region of the block in the widthwise direction of the tire.

Figure 2:
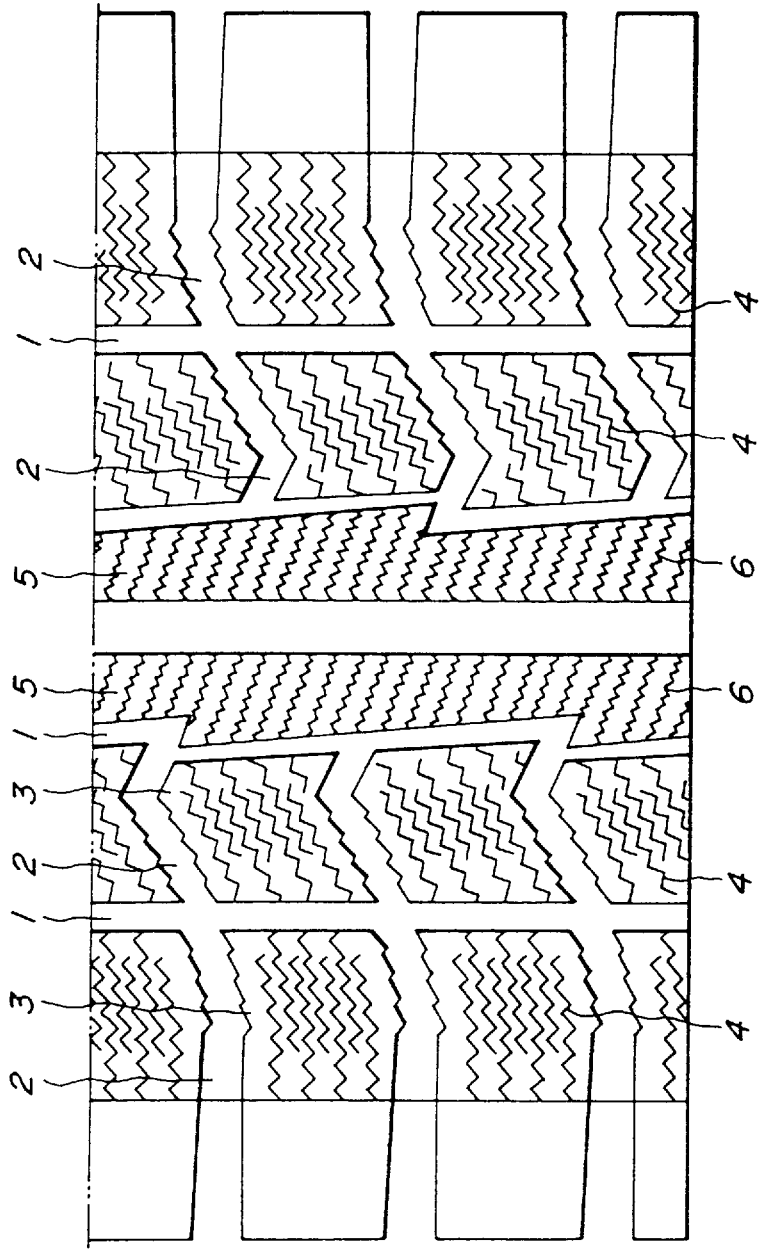
FIG. 2 is a developed view of a tread pattern in a comparative example.

As shown in FIG. 2, the tire of the comparative example has substantially the same tread pattern as in the tire of the example except that the amplitude and pitch of the wave-shaped sipe 4 at both side regions of the block 3 in the widthwise direction of the tire are the same as those of the wave-shaped sipe 4 at the central region of the block 3 in the widthwise direction of the tire.

The test for the evaluation of the running performance on ice is made with respect to the tires of the example and the comparative example.

Each of these tires is mounted on front and rear wheels of a vehicle and inflated under an internal pressure of 1.8 $kgf/cm^2$ and then run on an ice road surface of a test course. During the test a feeling performance on ice is evaluated by total feeling on braking, traction, straight running and cornering and a braking performance on ice is evaluated by measuring a braking distance when the tire is fully braked from a state of running at a speed of 20 km/h on the ice road surface.

When the evaluation results of these performances are represented by an index value on the basis that the tire of the comparative example is 100, the index values of the feeling performance on ice and the braking performance on ice of the tire of the example are 103 and 105, respectively. Moreover, the larger the index value, the better the performance.

As seen from the above results, the tire of the example according to the invention is excellent in the running performance on ice as compared with the tire of the comparative example.

What is claimed is:

1. A pneumatic studless tire comprising: a tread provided with a plurality of circumferential grooves arranged at given intervals in a widthwise direction of the tire and extending in a circumferential direction of the tire or substantially in the circumferential direction, a plurality of lateral grooves arranged at given intervals in the circumferential direction and extending in the widthwise direction or substantially in the widthwise direction and many blocks defined by these circumferential grooves and lateral grooves, wherein a plurality of wave-shaped sipes arranged side by side and extending substantially in the same direction as the lateral groove are formed in each of the blocks so that said sipes are dense at a central region of the block in the widthwise direction of the tire and sparse at both side regions of the block in the widthwise direction of the tire, and an amplitude of the wave-shaped sipe in each side region of the block in the widthwise direction of the tire is smaller than that in the central region of the block in the widthwise direction of the tire, and wherein a pitch of the wave-shaped sipe is large at the central region of the block in the widthwise direction of the tire and small at both side regions of the block.

2. A pneumatic studless tire according to claim 1, wherein a distance between the wave-shaped sipes at the central region of the block in the widthwise direction of the tire is 1.5–4.5 mm.

3. A pneumatic studless tire according to claim 2, wherein the distance between the wave-shaped sipes is 1.7–4.3 mm.

4. A pneumatic studless tire according to claim 1, wherein the amplitude of the wave-shaped sipe at the central region of the block is 1.25–10 times that at both side regions of the block.

5. A pneumatic studless tire according to claim 4, wherein the amplitude of the wave-shaped sipe at the central region of the block is 1.3–8 times that at both side regions of the block.

6. A pneumatic studless tire according to claim 1, wherein a width of the central region of the block in the widthwise direction of the tire is 10–70% of the width of the block in the widthwise direction of the tire.

7. A pneumatic studless tire according to claim 6, wherein the width of the central region tire is 20–65% of the width of the block.

8. A pneumatic studless tire according to claim 1, wherein at least a part of a border line between the block and the lateral groove extends wavingly.

9. A pneumatic studless tire comprising: a tread provided with a plurality of circumferential grooves arranged at given intervals in a widthwise direction of the tire and extending in a circumferential direction of the tire or substantially in the circumferential direction, a plurality of lateral grooves arranged at given intervals in the circumferential direction and extending in the widthwise direction or substantially in the widthwise direction and many blocks defined by these circumferential grooves and lateral grooves, wherein a plurality of wave-shaped sipes arranged side by side and extending substantially in the same direction as the lateral groove are formed in each of the blocks so that said sipes are dense at a central region of the block in the widthwise direction of the tire and sparse at both side regions of the block in the widthwise direction of the tire, and an amplitude of the wave-shaped sipe in each side region of the block in the widthwise direction of the tire is smaller than that in the central region of the block in the widthwise direction of the tire, said tire is provided on a widthwise central region of the tread with at least two circumferential ribs each having a plurality of wave-shaped sipes extending in the widthwise direction of the tire or substantially in the widthwise direction, and wherein an amplitude of the wave-shaped sipe formed in the circumferential rib is smaller than the amplitude of the wave-shaped sipe at both side regions of the block in the widthwise direction of the tire.

* * * * *